Oct. 26, 1943.  H. W. FATKIN  2,332,967
PLOTTING APPARATUS
Filed July 2, 1941  2 Sheets-Sheet 1

Inventor:
Harry W. Fatkin,
By Jas. C. Hobensmith
Attorney.

Oct. 26, 1943.  H. W. FATKIN  2,332,967
PLOTTING APPARATUS
Filed July 2, 1941  2 Sheets-Sheet 2

Inventor:
Harry W. Fatkin,
By Jno. E. Nobensmith
Attorney.

Patented Oct. 26, 1943

2,332,967

UNITED STATES PATENT OFFICE 2,332,967

PLOTTING APPARATUS

Harry W. Fatkin, Westville, N. J., assignor to Warren-Knight Company, Philadelphia, Pa., a corporation of Pennsylvania Application July 2, 1941, Serial No. 400,745

5 Claims. (Cl. 33—80)

This invention relates to plotting apparatus, and more particularly it relates to such apparatus for plotting courses and distances traveled by airplanes and ships. The apparatus may also have a useful field of application for the plotting of surveys and the like.

The principal object of the invention is to provide simple and efficient, and entirely self-contained, apparatus for plotting courses and distances on a chart or map.

A further object of the invention is to provide apparatus of the character aforesaid which is particularly adapted for use in confined spaces such, for example, as the cockpits of airplanes.

A further object of the invention is to provide apparatus of the character aforesaid which may be used for plotting courses and distances without the use of loose instruments, such as T squares, triangles, scales, and protractors, which cannot be advantageously used for plotting in the navigation of airplanes and the like.

A further object of the invention is to provide apparatus of the character aforesaid which will be relatively light, yet durable, whereby the same will be quite portable, to the end that it may be readily carried from place to place by a pilot, and thus form part of the pilot's standard equipment.

The nature and characteristic features of the invention will be more readily understood from the following description, taken in connection with the accompanying drawings forming part hereof, in which.

Figure 1:
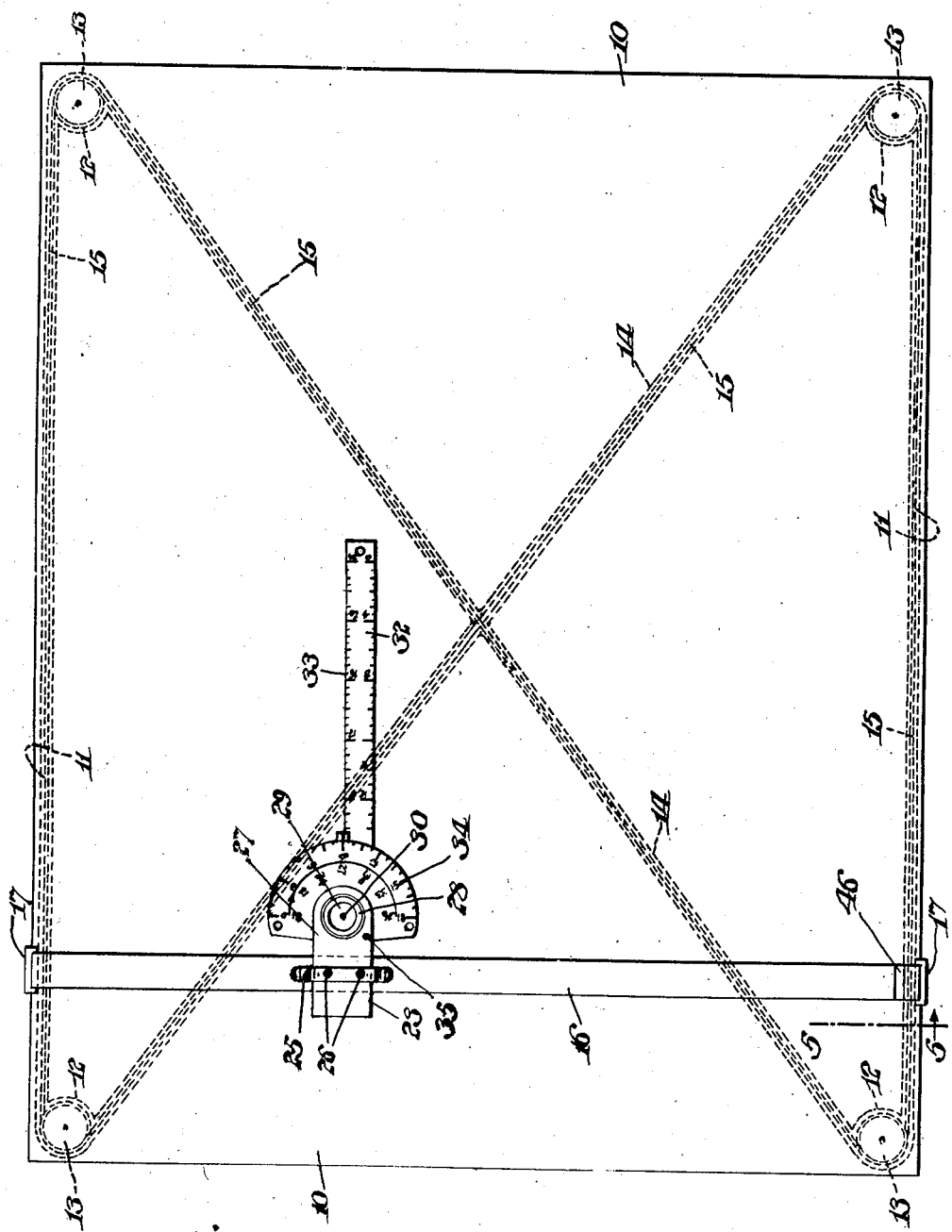
Figure 1 is a top or plan view, on a reduced scale, of plotting apparatus embodying the main features of the present invention.

It will, of course, be understood that the description, and the drawings herein, are illustrative merely, and that various modifications and changes may be made in the structure disclosed without departing from the spirit of the invention.

Referring to the drawings, the apparatus includes a plate member or board 10, which may be made of light metal such as aluminum, or if preferred, the same may be made of any of the modern plastics which may be found suitable for the purpose. The board 10 is recessed as at 11 along the top and bottom edges, on the under side, and it is also provided at each of its corners with a recess 12, also on the under side, and in which a pulley 13 is mounted. Diagonal recesses 14 extend from the pulleys 13 disposed at opposite corners. A cable 15 extends over the pulleys 13, passing through the recesses 11 at the top and bottom edges of the board, over the pulleys 13, and through the diagonal recesses 14.

Figure 4:
Fig. 4 is a transverse section of a drawing blade preferably employed in the apparatus, this section being taken on the line 4—4 of Fig. 2.
Figure 3:
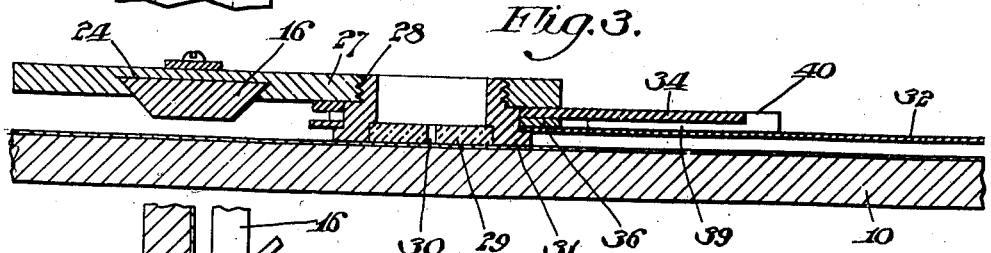
Fig. 3 is a horizontal section taken approximately on the line 3—3 of Fig. 2.
Figures 5, 6:
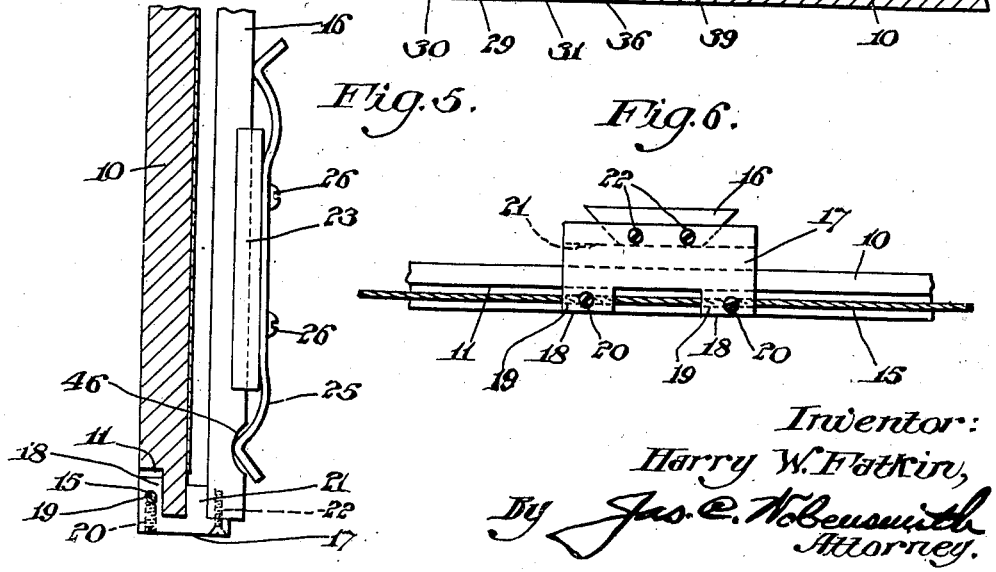
Fig. 5 is an enlarged sectional detail view, taken on the line 5—5 of Fig. 1.
Fig. 6 is an edge view, also enlarged, of the portion of the apparatus shown in Fig. 5 of the drawings.

Disposed above the top surface of the board 10 is a vertically disposed bar 16 of dovetail shape in cross section, as shown in Fig. 4 of the drawings. Each end of the bar 16 is secured to a slide member 17. The slide members 17 engage the top or bottom edges, respectively, of the board, as illustrated in Figs. 1, 5, and 6, of the drawings. Each of the slide members 17 has a portion 18 extending into the recess 11 at the top or the bottom of the board, as the case may be, and said portions 18 each have apertures 19 extending therethrough. The cable 15 extends through the apertures 19. Set screws 20 are provided to secure the slide members 17 to the cable.

The foregoing arrangement is such that the bar 16 is constrained by means of the cable to be at all times truly vertical as the same is moved from place to place over the top surface of the board 10. Each of the slide members 17 is also provided with a lug 21 which extends over the edge portion of the board, and also serves as a seat for the end portion of the bar 16. The bar 16 is secured at each end to the slide member 17 disposed at that end by means of screws 22.

The vertically extending bar 16 also carries a slide member 23 which may be moved up and down thereon to the desired position. Said slide member 23 is recessed as at 24 on its under face complemental to the dovetail shape of the bar 16. The slide member 23, which is mounted on the bar 16 is also provided with a leaf spring 25 secured thereto by means of suitable screws 26. The end portions of said leaf spring 25 extend beyond the edge portions of the slide member 23, and normally engage the upper surface of the bar 16 thus serving by frictional engagement to maintain the slide member 23 at any given position on the bar, yet permitting the same to be readily shifted when desired. At the lower end of the bar 16 there is provided a transverse groove 46 which serves, by reason of the engagement of a portion of the leaf spring 25 therewith, to prevent the slide member, and the parts carried thereby, from sliding off the lower end of the bar, and thus become accidentally detached.

The slide member 23 has a projecting portion 27 in which a hollow stud 28 is threaded. The stud 28 has mounted, in the lower portion thereof, a disc 29 preferably made of transparent plastic and having a central pencil point aperture 30 extending therethrough, at the central axis of said stud. The stud 28 is provided with a head portion 31 which provides, in conjunction with the lower face of the extending portion 27 of the slide member 23, an annular recess in which certain of the parts are disposed for axial movement about the stud member.

Figure 2:
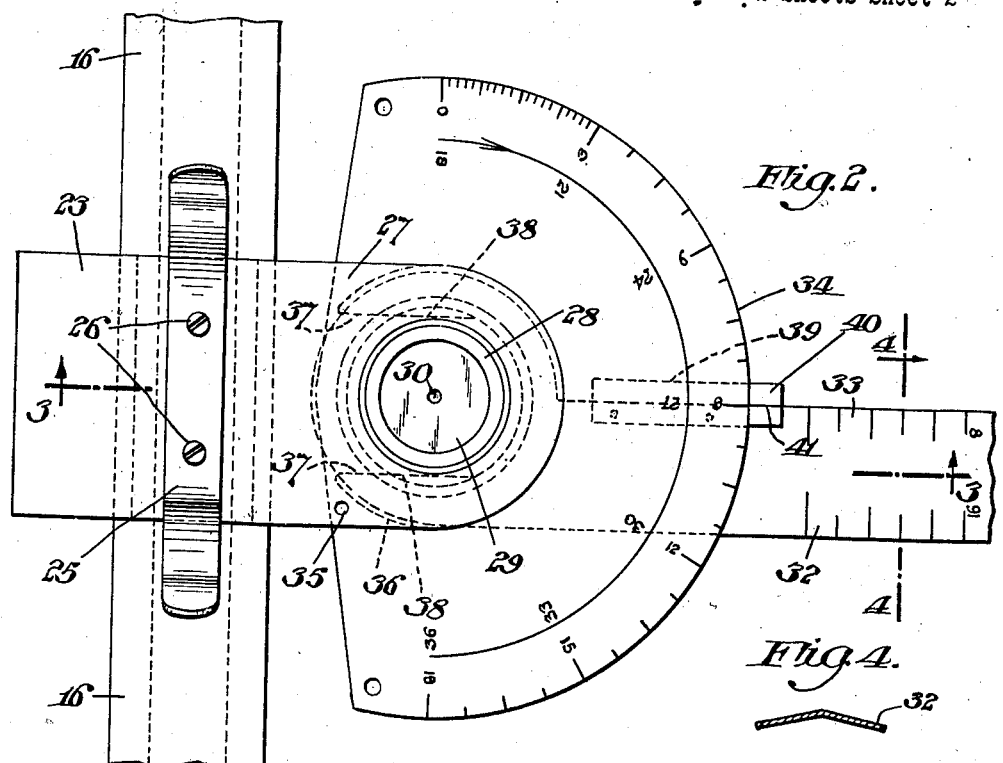
Fig. 2 is an enlarged fragmentary detail view, in top plan, of a portion of the apparatus.

One of the parts thus mounted on the stud, in the recess above referred to, is the blade member 32, the upper or working edge 33 of which is disposed in alinement with the central axis of the stud 28. Above the blade member 32, and also mounted on the stud is a protractor member 34 which is also axially movable about the stud member, although the same may be fixedly located with respect thereto by passing a pin through an aperture 35 provided in the slide member 23, and a corresponding registering aperture (not shown) provided in the portion of the protractor member 34 which is disposed beneath the extending portion 27 of the slide member 23. Interposed between the protractor member 34 and the ear portion of the blade member 32 is a spring member 36, U-shaped as indicated in dotted lines in Fig. 2 of the drawings. The spring member 36 has inner edge portions 37 which engage flat portions 38 provided on the stud 28, whereby the spring member 36 is constrained against rotation on the stud member 28. In this manner the motion of the blade 32 about the axis of the stud will be prevented from being transmitted to the protractor, or vice versa.

A plate member 39 is also secured to the blade member 32 along the working edge thereof. The major portion of this plate member 39 is disposed below the protractor member 34 but a portion thereof projects beyond the periphery of the protractor member 34 and extends upwardly to provide an upper surface 40 which registers with the upper surface of the protractor 34. On the upper surface of this portion of the plate member 39 there is provided an indicia line 41 which assists in the accurate setting of the blade member 32 with respect to the protractor 34.

The exposed portion of the plate member 39 may be made larger and a Vernier scale provided on the surface 40 thereof, for more accurate work.

The operation and manner of use of the apparatus will be readily apparent to those who are qualified to use the same.

The chart or map upon which the course is to be plotted is first secured to the top surface of the plate member 10 and in any suitable manner. Any slight misalinement of the chart may be taken care of by shifting the protractor member 34 on the stud 28, the indicia line 41 of the plate member 39, meanwhile being brought to the suitable marking on the protractor. It will, of course, be obvious that the entire field of the chart to the right of the bar member 16 may be readily used for the plotting. If, however, it should become necessary to work on the left hand side of the bar member, the slide member 23 is pushed downwardly on the bar member 16 until the lower end of the leaf spring 25 encounters the transverse groove 46. This would normally prevent the slide member from passing off the lower end of the bar 16, but the operator may readily raise the free end of the spring out of engagement with the groove 26, whereupon the slide member 23 may be entirely removed from the bar 16, and replaced thereon in inverted position with the protractor and blade members to the left of said bar member.

The device has, in practice, proved to be very useful and efficient in its operation. One of its most admirable characteristics is that in the actual working structure, the over all thickness of the parts, including the plate member, is somewhat less than one-half inch.

I claim:

1. Plotting apparatus comprising a plate member having an upper working surface upon which the plotting is done, slide members engaging the top and bottom edges of said plate member, means connected with said slide members to constrain them to move in unison, a bar member supported by said slide members and extending over the working surface of the plate member, a slide member mounted on said bar, a hollow stud carried by said slide member, a protractor having a limited range of rotatable movement on said stud, a blade rotatably mounted on said stud and having an upper working edge, and means for retaining said last mentioned slide member against accidental removal from the bar, said means comprising a leaf spring mounted on said slide member having an overhanging portion normally engaging the upper surface of the bar, and the bar having a transverse groove near one end thereof engageable by said overhanging portion of the leaf spring.

2. Plotting apparatus comprising a plate member having an upper working surface upon which the plotting is done, said plate member having recesses extending along opposite edges, members slidably engaging said edges and each having a portion extending into one of said recesses, means for constraining said slidable members to move in unison including an endless cable having portions disposed in the edge recesses of the plate, the portions of the slidable members which extend into said edge recesses being secured to said cable, a bar member supported by said slidable members and extending over and above the working surface of the plate member, a slide member movably mounted on said bar member, means for normally holding said slide member at any given position on the bar member, said last mentioned slide member having a portion projecting sidewise beyond the edge of the bar member, a protractor carried by said projecting portion of said slide member, and a blade rotatably mounted on said projecting portion of said slide member and having a working edge in alinement with its axis of rotation.

3. Plotting apparatus comprising a plate member having an upper working surface upon which the plotting is done, members slidably engaging the edges of the plate member, means for constraining said slidable members to move in unison, a bar member supported by said slidable members and extending over and above the working surface of the plate member, said bar member being of a dovetail shape in cross section, a complementally shaped slide member movably mounted on said bar member, means for normally holding said slide member at any given position on the bar member comprising a leaf spring secured to said slide member and having end portions engaging the bar member, said last mentioned slide member having a portion projecting sidewise beyond the edge of the bar member, a hollow stud carried by the projecting portion of said slide member, a central point indicator carried by said stud, a protractor centered on said stud, and a blade rotatably mounted on said stud and having a working edge in alinement with the central point indicator.

4. Plotting apparatus comprising a plate member having an upper working surface upon which the plotting is done, members slidably engaging the edges of the plate member, means for constraining said slidable members to move in unison, a bar member supported by said slidable members and extending over and above the working surface of the plate member, a slide member movably mounted on said bar member, means for normally holding said slide member at any given position on the bar member, said last mentioned slide member having a portion projecting sidewise beyond the edge of the bar member, a hollow stud carried by the projecting portion of said slide member, a central point indicator carried by said stud, a protractor having a limited range of rotatable movement on said stud, a blade rotatably mounted on said stud and having a working edge in alinement with the central point indicator, and means on said stud to prevent the motion of the blade being transmitted to the protractor.

5. Plotting apparatus comprising a plate member having an upper working surface upon which the plotting is done, said plate member having recesses extending along opposite edges, members slidably engaging said edges and each having a portion extending into one of said recesses, means for constraining said slidable members to move in unison including an endless cable having portions disposed in the edge recesses of the plate member, the portions of the slidable members which extend into said edge recesses being secured to said cable, a bar member supported by said slidable members and extending over and above the working surface of the plate member, said bar member being of a dovetail shape in cross section, a complementally shaped slide member movably mounted on said bar member, means for normally holding said slide member at any given position on the bar member comprising a leaf spring secured to said slide member and having end portions engaging the bar member, said last mentioned slide member having a portion projecting sidewise beyond the edge of the bar member, a hollow stud carried by the projecting portion of said slide member, a central point indicator carried by said stud, a protractor having a limited range of rotatable movement on said stud, a blade rotatably mounted on said stud and having a working edge in alinement with the central point indicator, and means on said stud to prevent the motion of the blade being transmitted to the protractor.

HARRY W. FATKIN.